United States Patent [19]

Carson

[11] 4,197,868
[45] Apr. 15, 1980

[54] FLOW CONTROL SYSTEM AND CONTROL METHOD FOR PARALLEL FLOW PROCESS EQUIPMENT

[75] Inventor: Don B. Carson, Mt. Prospect, Ill.

[73] Assignee: UOP Inc., Des Plaines, Ill.

[21] Appl. No.: 935,398

[22] Filed: Aug. 21, 1978

[51] Int. Cl.² .......................................... G05D 11/035
[52] U.S. Cl. ............................................. 137/7; 137/8; 137/101; 137/110; 165/38
[58] Field of Search ................... 137/7, 8, 9, 10, 101, 137/110; 165/34, 38

[56] References Cited

U.S. PATENT DOCUMENTS

| | | | |
|---|---|---|---|
| 2,041,863 | 5/1936 | Rhodes | 137/110 |
| 3,779,266 | 12/1973 | Fruth | 137/110 |

FOREIGN PATENT DOCUMENTS 1387345  3/1975  United Kingdom ..................... 137/110

*Primary Examiner*—Robert G. Nilson
*Attorney, Agent, or Firm*—James R. Hoatson, Jr.; John F. Spears, Jr.; William H. Page, II

[57] ABSTRACT

A control system and a method for regulating the division of a single feed stream between two or more pieces of processing equipment operated in parallel. The feed stream enters a three-way valve and is then equally divided into two smaller streams which flow through separate pieces of process equipment and then through separate check valves. The pressure of each of the smaller streams is monitored to detect leakage in either piece of the equipment. The flow normally passing through the leaking piece of equipment is diverted to the intact piece of equipment when the leakage causes a predetermined pressure difference.

4 Claims, 1 Drawing Figure

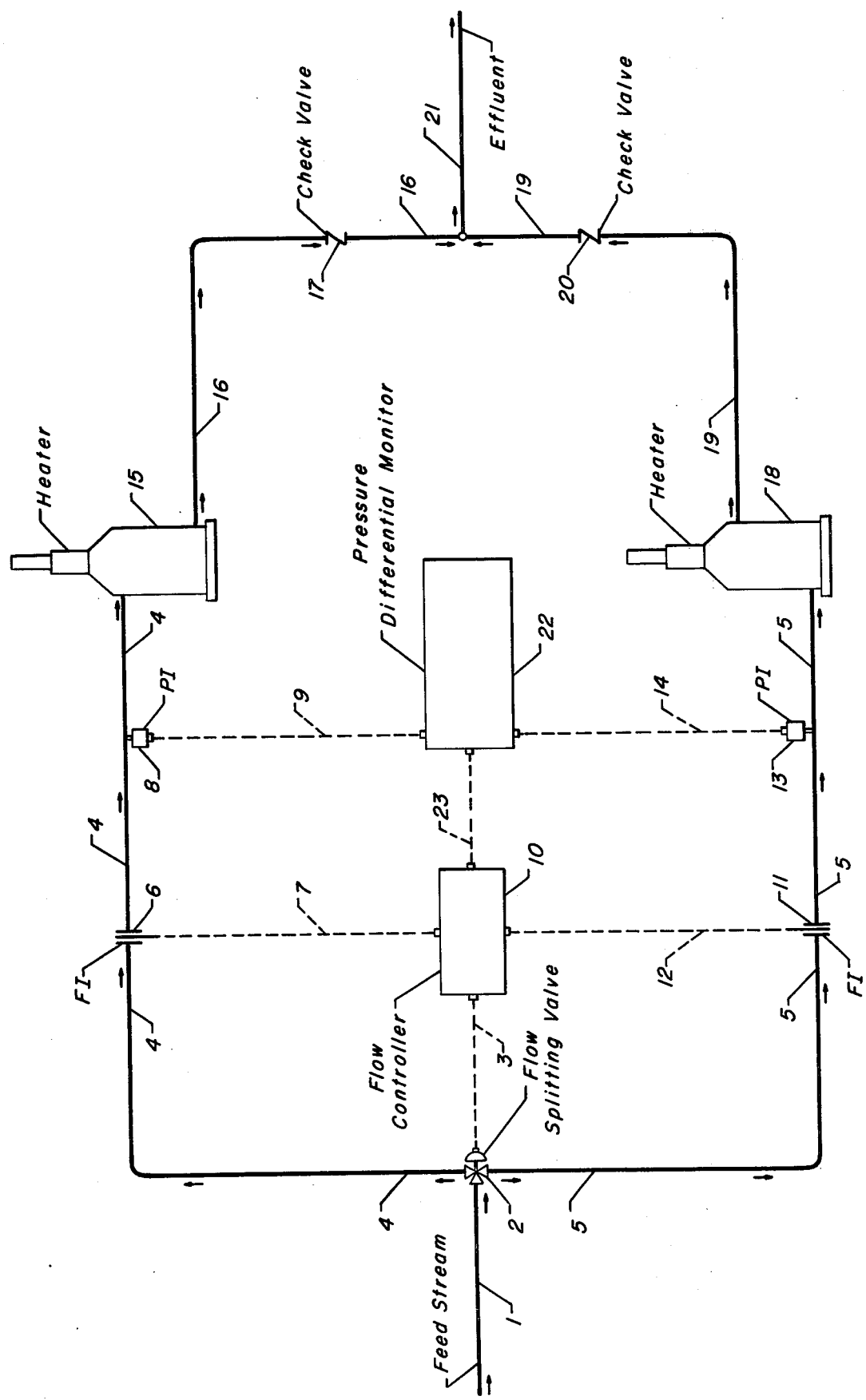

FLOW CONTROL SYSTEM AND CONTROL METHOD FOR PARALLEL FLOW PROCESS EQUIPMENT

FIELD OF THE INVENTION

The invention relates to a flow control system for use in a chemical or hydrocarbon conversion process. The invention also relates to a method of controlling the flow of carbonaceous fluid streams in refineries. The invention specifically relates to a method and system for controlling the division of a feed stream between two heat exchangers operated in parallel which decreases the problems caused by the failure of one of the heat exchangers.

PRIOR ART

The very large flow rates of many process streams in commercial chemical, petrochemical and petroleum refining operations often makes it necessary to utilize two or more pieces of process equipment in parallel. This is especially true of heat exchangers, such as heaters or air-cooled condensers. The tubing used in heat exchangers may fail due to the effects of temperature, time, corrosion or erosion. The result is the rapid discharge of the pressurized contents of the heat exchange tubing. This may have catastrophic effects because of the normally highly flammable nature of most petrochemicals and petroleum products.

Automated shut-down systems which are triggered by a loss of pressure or fluid flow have been used to lessen the dangerous consequences of equipment failure. These systems may include the use of pressure sensors which activate a controller, with the controller shutting down a pump or compressor.

The flow through fired heaters is often monitored. It is known to integrate the control system regulating the flow of fuel to the heater with the device monitoring the flow of the heated fluid. The flow of fuel is cut back or stopped if the flow rate of the heated fluid drops drastically. The objective of this is to prevent overheating of the heater tubes or the formation of carbon deposits within the tubes.

BRIEF SUMMARY OF THE INVENTION

The invention provides a method of regulating the division of a process stream between two heat exchangers operated in parallel. The invention also provides a control system for isolating a failed piece of process equipment which is operated in parallel flow with another similar piece of process equipment. This control system comprises a three-way valve means connected to an inlet conduit; a first and a second heat exchanger each having an inlet and an outlet; a first flow conduit operatively connecting the valve means to the first heat exchanger and a second flow conduit connecting the valve means to the second heat exchanger; an outlet conduit; a third conduit connecting the outlet of the first heat exchanger to the outlet conduit; a fourth conduit connecting the outlet of the second heat exchanger to the outlet conduit; a first check valve in the third conduit and a second check valve in the fourth conduit both oriented to prevent fluid flow toward the three-way valve; a flow rate measurement and control means comprising process flow rate sensors operatively connected to the first and the second flow conduit, the flow rate measurement and control means comparing the fluid flow rates in the first and the second flow conduits and generating a first signal which regulates the operation of the three-way valve; a pressure differential monitoring means comprising a pressure differential control unit operatively connected to pressure sensors in the first and the second process flow conduits and which generates a second signal if the pressure difference between the two conduits exceeds a predetermined limit; and signal-carrying means interconnecting the valve, the flow rate measurement and control means and the pressure differential monitoring means.

This control system isolates the failed heat exchanger and limits the escape of the process fluid. The invention also prevents the depressurization of an entire chain of processing equipment, thereby reducing the hazards associated with rapid equipment depressurizations.

DESCRIPTION OF THE DRAWING

The Drawing illustrates the preferred embodiment of the invention. For clarity and simplicity, various subsystems and pieces of apparatus associated with the operation of this embodiment have not been shown. These items include pumps, temperature measurement and control systems, heater internals, and heater control systems, all of which may be of customary design. This representation of the preferred embodiment is not intended to preclude from the scope of the invention those other embodiments set out herein or which are the result of normal modifications of those embodiments.

Referring now to the Drawing, a feed stream to a hydrocarbon conversion process is passed into the inlet of a three-way valve 2 through conduit 1. This valve is adjusted in response to a signal carried by means 3 in a manner which divides the feed stream into two process streams having substantially equal flow rates. The first process stream flows through a first outlet of the valve means and into a conduit 4. The flow rate of the first process stream is measured by a flow rate indicator or sensor 6 which generates a signal transmitted through a signal-carrying means 7. The pressure of the first process stream is measured by a pressure indicator or sensor 8 which generates a signal transmitted through a signal-carrying means 9.

The second process stream flows through a second outlet of the valve means and into conduit 5. The flow rate of the second process stream is measured by a flow rate indicator 11 which generates a signal transmitted through a signal-carrying means 12. The pressure of the second process stream is measured by a pressure indicator 13 which generates a signal transmitted through a signal-carrying means 14.

The first process stream flows through a fired heater 15 and is heated to a higher temperature. It then flows into conduit 16 and through a check valve 17. In a similar manner, the second process stream is heated in a fired heater 18 and then flows into conduit 19 and through a check valve 20. The first and the second process streams are then admixed by passage into an outlet conduit 21.

During normal operations, the movement and position of the three-way valve is governed by a signal generated in a flow controller 10. This signal is determined by the controller based on a comparison of the flow rates of the two process streams. The signal is maintained at a value which positions the valve to divide the feed stream into two process streams having substantially equal flow rates. If the tubing in either heater ruptures, a portion of the process stream will then be released from the system. This produces a lower pressure within the failed piece of tubing and in the conduits upstream of it and also produces a pressure differential between conduits 4 and 5. The pressure differential monitor 22 detects this condition from the signals transmitted to it by the pressure indicators. The pressure differential monitor then generates a second signal which is transmitted to the flow controller 10 through a signal-carrying means 23.

In response to the second signal, the flow controller 10 changes the position of the flow splitting valve 2 in a manner which isolates the leaking heater. That is, the flow of the entire feed stream is directed into the heater which has not failed. Check valve 17 or 20 prevents the process stream from flowing backward into the failed heater. The failed heater is therefore isolated, and leakage of the process fluid and the depressurization of the remainder of the processing equipment is minimized.

DETAILED DESCRIPTION

Many types of heat exchangers and other process equipment including reactors and condensers are used in parallel flow in the petroleum refining, petrochemical and chemical industries. As used herein, the term "parallel flow" is intended to refer to the passage of two or more smaller streams derived from a single source stream through an equal number of separate but similar pieces of process equipment, with each of the smaller streams passing through a different piece of equipment. The two heaters shown in the Drawing are operated in parallel flow.

Each of the smaller streams may flow through several pieces of equipment used in parallel. For instance, the feed stream to a crude oil fractionation column may be divided into two smaller streams, each of which is sequentially heated in an indirect heat exchanger, desalted, further heated by exchange against several process streams and then passed into a fired heater. Such smaller streams are often recombined at some point such as the entrance to the crude oil fractionation column or a reactor. The parallel flow of fluid process streams is similar to the parallel flow of an electrical current through two or more electronic components arranged in parallel. It is to be distinguished from series flow wherein all of a fluid stream passes through several pieces of process equipment in sequence.

As used herein, the term "heat exchanger" is intended to be a generic reference to any form of mechanical apparatus wherein the temperature of a first fluid is changed by indirect heat exchange against a second fluid having a different temperature and pressure through a solid heat conducting medium. Examples of commonly used apparatus which it is intended to include within this definition are fired heaters, tube and shell heat exchangers, reboilers, and air-cooled condensers. The geometry of the solid normally metallic heat conducting medium may vary widely. It is normally in the form of tubular conduits but may be a flat plate or a spiral. One or both of the fluid streams may contain particulate material disposed in a fixed or fluidized bed. For instance, the heat exchanger may be utilized to remove heat from a fluidized combustion or oxidation zone. The two heat exchangers which are operated in parallel flow may be located within the same enclosure or vessel. For instance, a single fired heater may have parallel heater coils and more than one steam generator may be located within a single combustion zone.

The failure of any piece of hydrocarbon processing equipment may have serious or even disastrous effects. This is especially true in the case of heat exchangers in which the leaking fluid is not confined within another outer vessel or structure. Examples of these heat exchangers are fired heaters and air-cooled condensers. The leakage of hydrocarbons from one of these exchangers is likely to result in a fire and may produce an explosion. If the fluid within the heat exchanger is pressurized, the failure of the heat exchanger may cause a rapid depressurization of the entire process connected to it, resulting in a hazardous situation to personnel and property. A rapid total stoppage of the flow through a hydrocarbon conversion process may also have a very detrimental effect on any solid catalyst which is used in the process.

It is therefore an objective of the invention to provide a control system for regulating the division of a process feed stream between two pieces of process equipment operated in parallel. It is also an objective of the invention to provide a method of regulating the flow of a process stream through two heat exchangers operated in parallel flow. It is a further objective to provide a system for isolating one of two heat exchangers used in parallel flow which does not totally terminate the flow of the process stream passing through the heat exchangers. It is another objective of the invention to provide a system for the operation of parallel heat exchangers which limits the depressurization of equipment connected to the heat exchangers upon the failure of one of them.

Basic to the invention is the use of a three-way valve. This flow diversion valve is to be of the type which can close off against either discharge opening but which cannot close off against both simultaneously. The valve must be capable of dividing a single incoming feed stream into two process streams and of regulating the relative flow rates of the two process streams. Valves of this nature are available commercially and may be correctly selected by one skilled in the art of process design.

The valve is preferably operated by an actuator which automatically responds to the signals generated by the control units. The actuator may be pneumatically, electrically, or hydraulically powered. The control signals are carried by the appropriate type of conventional signal carrying means, such as insulated wire for electrical signals and air lines for pneumatic signals.

The three-way valve means is connected to three process flow conduits, the inlet line for the feed stream and the two outlet lines leading to the two pieces of parallel flow equipment. These and the other conduits used to interconnect the various pieces of process equipment of the system will be the conventional piping normally used in the process. The check valves located downstream of the parallel flow equipment may also be conventional. They are to be oriented to allow flow only in the normal direction of away from the three-way valve.

A flow rate sensor or indicator and a pressure sensor are preferably located in each of the process flow conduits which connect the three-way valve means to the parallel flow process equipment. Preferably, the pressure sensor is located downstream of the flow rate sensor and relatively close to the particular piece of parallel flow equipment which it may be desired to isolate. The pressure sensor may be located downstream of this piece of equipment, but must be upstream of the check valve employed downstream of the equipment. The pressure sensors should be installed at corresponding locations in the two branches of the fluid flow path. That is, if one pressure sensor is located at the entrance to a heat exchanger, then the second pressure sensor should be located at the entrance to the similar heat exchanger located in the other process flow conduit. Both types of sensors may be of a conventional type. For instance, the flow rate sensors may utilize pilot tubes, turbine meters, or ultrasonic flow measuring devices. The pressure measuring sensor is preferably a transducer mounted within the process flow conduit and which provides an electrical signal representative of the pressure within the conduit.

The flow rate sensors are interconnected with a flow rate controller by signal carrying means of the appropriate type. The controller may be a conventional digital, analog or fluidic device. The controller compares the signals transmitted to it by the flow rate sensors and generates the signal delivered to the actuator of the three-way valve. The value of this first signal should correspond to the adjustment in the position of the valve required to eliminate any difference between the fluid flow rate through the two process flow conduits. That is, the flow rate controller is to be programmed or constructed to equalize the flow in the two pieces of parallel flow process equipment. The two flow rate sensors, the flow controller and the interconnecting signal-carrying means all act together to effect this equalization of the two fluid streams. They may therefore be considered a single integrated part of the total flow control system and are referred to herein as a flow rate measurement and control means.

Similarly, the two pressure sensors, the pressure differential control unit, and their interconnecting signal-carrying means are grouped together and referred to herein as a pressure differential measurement and monitoring means. The control unit used to monitor the pressure differential may also be a conventional type and may be digital, analog or fluidic. Preferably, this control unit has a setpoint which is adjustable for the allowable pressure difference between the two process flow streams. The predetermined limit of the allowable pressure differential will vary with the absolute pressure within the process flow conduit. For instance, if the pressure within the conduits is on the order of one atmosphere guage, a pressure differential of 0.5 atm. is quite high and would be indicative of serious equipment failure. On a high pressure unit such as a hydrocracker or an ammonia plant wherein the pressure may be on the order of 10-35 atm. gauge, a higher allowable pressure differential of about 1.0 atm. or more may be desired. In this instance, a higher predetermined limit will prevent temporary minor fluctuations in the process from tripping the set point and causing a greater disruption in the operation.

When the pressure difference between the two monitored process streams exceeds the predetermined limit, the pressure differential control unit sends out a second actuating signal. This signal is representative of the adjustment in the position of the three-way valve means necessary to terminate the flow of the process stream having the lower pressure at the point at which the pressures are monitored. That is, the appropriate second signal will be selected to divert the entire fluid stream through the intact piece of parallel flow process equipment. The flow rate of the process stream having the higher pressure will therefore be increased and may approach that of the undivided feed stream.

The second signal may be transmitted directly to the actuator of the three-way valve. The second signal would then override or replace the first signal. However, it is preferred that the second signal is passed to or through the flow rate controller as is illustrated in the Drawing. The second signal may therefore adjust the setpoint of the flow rate controller in a manner which results in the first signal changing the position of the valve and terminating the division of the feed stream. The operation of the flow rate control unit may also be designed to change the value of the first signal when the second signal is received, or the flow rate control unit may be programmed to transmit only the second signal if it is received. The type of control units chosen, e.g. fluidic or electrical, will influence the operational method and arrangement selected.

Those skilled in the art will recognize that a single highly advanced process controller may easily perform the functions of both the flow rate controller and the pressure differential control unit. These advanced process controllers are actually small computers and may be capable of monitoring and adjusting a great number of variables in an entire refining or chemical process. Accordingly, in one embodiment of the invention, a single process control means is utilized to generate both the first and the second signals which are transmitted to the three-way valve.

Accordingly, one embodiment of the invention may be characterized as a method of regulating the flow of a process stream through two heat exchangers operated in parallel flow which comprises passing the feed stream into a three-way valve means operated in response to signals generated in a process control means, and dividing the feed stream into a first process stream having a first flow rate and a second process stream having a second flow rate; monitoring and comparing the flow rates of the first and the second process streams and generating a first signal in the process control means, the first signal being representative of the adjustment in the operation of the three-way valve means necessary to equalize the flow rates of the first and the second process streams; passing the first process stream through a first heat exchanger and passing the second process stream through a second heat exchanger; passing the first process stream through a first check valve and passing the second process stream through a second check valve; comparing the pressure of the first process stream at a point upstream of the first check valve to the pressure of the second process stream at a corresponding point upstream of the second check valve, and replacing the first signal by a second signal generated in the process control means if the pressure differential between the first and the second process streams exceeds a predetermined limit which is greater than 0.5 atm., with the second signal being representative of and effecting the adjustment in the operation of the three-way valve means necessary to terminate the flow of the process stream having the lower pressure.

The invention satisfies the objectives set out above and also has several advantages. It provides a system and method for isolating a failed heat exchanger or other piece of process equipment. Use of the invention also prevents the uncontrolled discharge of process fluids from the ruptured heat exchanger. One advantage of the invention is that there will not be a total cessation of fluid flow through the downstream sections of the process and the conditions and flow rate in these sections should quickly return to near normal. This will lower the impact of the heater failure on the rest of the process and should allow a controlled shut-down of the process. The ability to shut down a process in an orderly manner may be very important from the standpoint of safety and such practical considerations as maintaining catalyst activity. For instance, if the parallel flow heat exchangers are used to heat the hydrogen charged to a hydroprocessing reaction zone, the invention would maintain the flow of hydrogen to the reaction zone. The hydrogen may be supplied at a lower temperature or a lower rate and the conversion in the reaction zone may suffer, but the catalyst will not be rapidly deactivated because of a severe hydrogen deficiency.

The use of a three-way valve which cannot close off against both discharge ports simultaneously provides another advantage. It is not necessary to provide a pressure-relieving system upstream of the control valve since the flow is not totally blocked off. Also, it is not necessary to increase the design pressure of the upstream equipment.

I claim as my invention:

1. A flow control systrem for regulating the flow of a process stream through two heat exchangers operated in parallel which comprises:
   (a) a three-way valve means having an inlet port and a first and a second outlet ports;
   (b) an inlet conduit which carries the entire process stream operatively connected to the inlet port of the three-way valve means;
   (c) a first and a second heat exchanger, with each heat exchanger having an inlet and an outlet;
   (d) a first process flow conduit which operatively extends between the first outlet port of the three-way valve means and the inlet of the first heat exchanger;
   (e) a second process flow conduit which operatively extends between the second outlet port of the three-way valve means and the inlet of the second heat exchanger;
   (f) a third and a fourth process flow conduit, with the third process flow conduit having a first end attached to the outlet of the first heat exchanger and with the fourth process flow conduit having a first end attached to the outlet of the second heat exchanger, the third and the fourth process flow conduits each also having a second end;
   (g) an outlet conduit which carries the entire process flow stream operatively connected to the second end of both the third and the fourth process flow conduits;
   (h) a first check valve located in the third process flow conduit and a second check valve located in the fourth process flow conduit; with both the first and the second check valves oriented to prevent fluid flow toward the three-way valve means;
   (i) a flow rate measurement and control means comprising operatively connected flow rate sensors located in the first and the second process flow conduits and a flow rate controller and which monitors and compares the fluid flow rates in the first and the second process flow conduits, the flow rate measurement and control means generating a first signal which is transmitted to the three-way valve means and which regulates the operation of the three-way valve means;
   (j) a pressure differential measurement and monitoring means comprising operatively connected pressure sensors located in the first and to the second process flow conduits and a pressure differential control unit and which generates a second signal when the pressure difference between the first and the second process flow conduits exceeds a predetermined limit; and,
   (k) a first signal-carrying means which interconnects the flow rate measurement and control means and the three-way valve means for transmitting the first signal, and a second signal-carrying means which interconnects the pressure differential monitoring means and the flow rate measurement and control means for transmitting the second signal.

2. A method of regulating the flow of a process stream through two heat exchangers operated in parallel-flow which comprises:
   (a) passing the feed stream into a three-way valve means operated in response to signals generated in a process control means, and dividing the feed stream into a first process stream having a first flow rate and a second process stream having a second flow rate;
   (b) monitoring and comparing the flow rates of the first and the second process streams and generating a first signal in the process control means, the first signal being representative of the adjustment in the operation of the three-way valve means necessary to equalize the flow rates of the first and the second process streams;
   (c) passing the first process stream through a first heat exchanger and passing the second process stream through a second heat exchanger;
   (d) passing the first process stream through a first check valve and passing the second process stream through a second check valve; and,
   (e) comparing the pressure of the first process stream at a point upstream of the first check valve to the pressure of the second process stream at a corresponding point upstream of the second check valve, and replacing the first signal of step (b) by a second signal generated in the process control means if the pressure differential between the first and the second process streams exceeds a predetermined limit, with the second signal effecting the adjustment in the operation of the three-way valve means necessary to terminate the flow of the process stream having the lower pressure.

3. The method of claim 2 further characterized in that the predetermined limit of the pressure differential exceeds 0.5 atm.

4. The method of claim 3 further characterized in that the predetermined limit of the pressure differential exceeds 1.0 atm.

* * * * *